(12) United States Patent
Pettygrove et al.

(10) Patent No.: US 12,155,433 B2
(45) Date of Patent: Nov. 26, 2024

(54) ANTENNA PATTERN OVERLAYS ON ANTENNA LINE-OF-SIGHT IMAGES FROM AN ANTENNA ALIGNMENT DEVICE

(71) Applicant: Viavi Solutions Inc., Chandler, AZ (US)

(72) Inventors: Scott Pettygrove, Leesburg, VA (US); Jim Neuens, Lusby, MD (US)

(73) Assignee: Viavi Solutions Inc., Chandler, AZ (US)

( * ) Notice: Subject to any disclaimer, the term of this patent is extended or adjusted under 35 U.S.C. 154(b) by 217 days.

(21) Appl. No.: 18/048,154

(22) Filed: Oct. 20, 2022

(65) Prior Publication Data
US 2024/0137085 A1 Apr. 25, 2024
US 2024/0235631 A9 Jul. 11, 2024

(51) Int. Cl.
*H04B 7/06* (2006.01)
*H04B 7/08* (2006.01)

(52) U.S. Cl.
CPC .......... *H04B 7/0608* (2013.01); *H04B 7/0802* (2013.01)

(58) Field of Classification Search
CPC .......................... H04B 7/0608; H04B 7/0802
USPC .......................................................... 375/262
See application file for complete search history.

(56) References Cited

U.S. PATENT DOCUMENTS

| 2004/0169587 | A1* | 9/2004 | Washington | ....... G06K 7/10079 340/572.1 |
| 2017/0237456 | A1* | 8/2017 | Shaker | ............... A61B 17/1327 455/65 |

* cited by examiner

*Primary Examiner* — Fitwi Y Hailegiorgis
(74) *Attorney, Agent, or Firm* — DLA Piper LLP (US)

(57) ABSTRACT

An antenna alignment device may have a camera that takes a line-of-sight image. For an antenna alignment device directed to a boresight of an antenna, the line-of-sight image is the "view" from the antenna to the surrounding environment. An antenna radiation pattern, based on the antenna type, may be overlaid on the line-of-sight image. A technician and or other user can therefore observe the radiation pattern vis-à-vis the surrounding environment. Therefore, it can be determined during the initial alignment stage, whether the antenna alignment may have to be changed to account for structures and or other blockages in the surrounding environment rather than just relying antenna alignment based on an ideal model site. The overlaying also speeds up troubleshooting as it can be used to provide clear and specific alignment instructions prior to deploying crew to the antenna site.

20 Claims, 5 Drawing Sheets

400

ANTENNA PATTERN OVERLAYS ON ANTENNA LINE-OF-SIGHT IMAGES FROM AN ANTENNA ALIGNMENT DEVICE

BACKGROUND

Modern communication systems rely heavily on radio frequency wireless signals transmitted and received by antennas. On the transmit side, antennas receive fluctuating electrical currents through wires from connected circuitry and generate wireless signals as electromagnetic fields corresponding to the fluctuating electrical currents. On the receive side, antennas convert electromagnetic fields of the received wireless signals to electrical currents carried through wires to the connected circuitry. Because of directional oscillation of electrical and magnetic fields, wireless signaling through transmittal and receipt of electromagnetic fields is inherently directional: heavily influenced by the location of the signal source, multipathing, beamforming, and or other aspects associated with electromagnetic fields and electromagnetic radiation. Antenna alignment may therefore be desired for optimizing bandwidth, signal strength, and or other transmit/receive parameters. Antenna alignment may generally be performed using antenna alignment devices.

Conventional antenna alignment devices, however, are confined to confirming whether the alignment parameters (e.g., azimuth, tilt, and or roll) are as specified in a radio frequency design. That is, the conventional antenna alignment devices provide feedback as to whether a position and an orientation of the antenna conform to the parameters provided by a radio frequency designer. But the radio frequency designs are based on an ideal model of the antenna site. This ideal model does not take into account the idiosyncrasies of the environment around the antenna site. For example, there may be buildings and trees and other temporary structures that may adversely impact the radiation pattern transmitted by the antenna and or the radiation pattern received by the antenna.

Using the conventional antenna alignment device and the ideal site model is generally cumbersome, expensive, and time-consuming to achieve an alignment based on the actual site conditions. As the actual site conditions are not considered during an initial alignment, antennas installed based on the ideal site model generally provide a poor key performance index. The rectification of this problem includes an expensive return visit to the site, a cumbersome ascent to the antenna location, and time-consuming troubleshooting.

As such, a significant improvement upon antenna alignment devices and methods is desired.

SUMMARY

Embodiments disclosed herein attempt to solve the aforementioned and other technical problems and may provide other solutions as well. An antenna alignment device may have a camera that takes a line-of-sight image. For an antenna alignment device directed to a boresight of an antenna, the line-of-sight image is the "view" from the antenna to the surrounding environment. An antenna radiation pattern, based on the antenna type, may be overlaid on the line-of-sight image. A technician and or other user can therefore observe the radiation pattern vis-à-vis the surrounding environment. Therefore, it can be determined during the initial alignment stage, whether the antenna alignment has to be changed to account for structures and other blocks in the surrounding environment. The overlaying also speeds up troubleshooting as it can be used to provide clear and specific alignment instructions prior to deploying crew to the antenna site.

In an embodiment, an antenna alignment system may be provided. The antenna alignment system may comprise a camera configured to capture a line-of-sight image of a surrounding environment of an antenna and a display configured to show the captured line-of-sight image. The antenna alignment system may further comprise a selection user interface configured to allow a user to select an antenna radiation pattern corresponding to the antenna. The display of the antenna alignment system may further be configured to overlay the antenna radiation pattern on the line-of-sight image thereby enabling a visualization of the antenna radiation pattern within the surrounding environment.

In another embodiment, an antenna alignment apparatus may be provided. The antenna alignment device may comprise a camera configured to capture a line-of-sight image of a surrounding environment of an antenna and a display configured to show the captured line-of-sight image. The antenna alignment device may further comprise a selection user interface configured to allow a user to select an antenna radiation pattern corresponding to the antenna. The display of the antenna alignment device may further be configured to overlay the antenna radiation pattern on the line-of-sight image thereby enabling a visualization of the antenna radiation pattern within the surrounding environment.

In yet another embodiment, an antenna alignment method may be provided. The method may comprise capturing, using a camera, a line-of-sight image of a surrounding environment of an antenna and showing, on a display, the captured line-of-sight image. The method may further comprise receiving, on a user interface, a selection of an antenna radiation pattern corresponding to the antenna. The method may additionally comprise overlaying, on the display, the antenna radiation pattern on the line-of-sight image to enable a visualization of the antenna radiation pattern within the surrounding environment.

DETAILED DESCRIPTION OF SEVERAL EMBODIMENTS

Conventional antenna alignment using alignment parameters from an ideal model of antenna site is inadequate. For example, the ideal model does not consider the surrounding environment of the antenna site. To mitigate this inadequacy, embodiments disclosed herein allow the capture of a line-of-sight image from an antenna alignment device and the selection of an antenna radiation pattern to be overlaid on the line-of-sight image. The line-of-sight image may show the view of an aligned antenna (i.e., based on the radio frequency design using the ideal model) and the overlaid antenna radiation pattern may show how one or more objects in the surrounding environment affect the antenna radiation pattern, thereby breaking the ideal model's assumption.

Using the embodiments disclosed herein, radio frequency designs may be assessed at the initial alignment state without a return to the antenna site. For troubleshooting, specific alignment instructions may be generated based on the overlay prior to deployment of the site crew to the antenna site.

Figure 1:
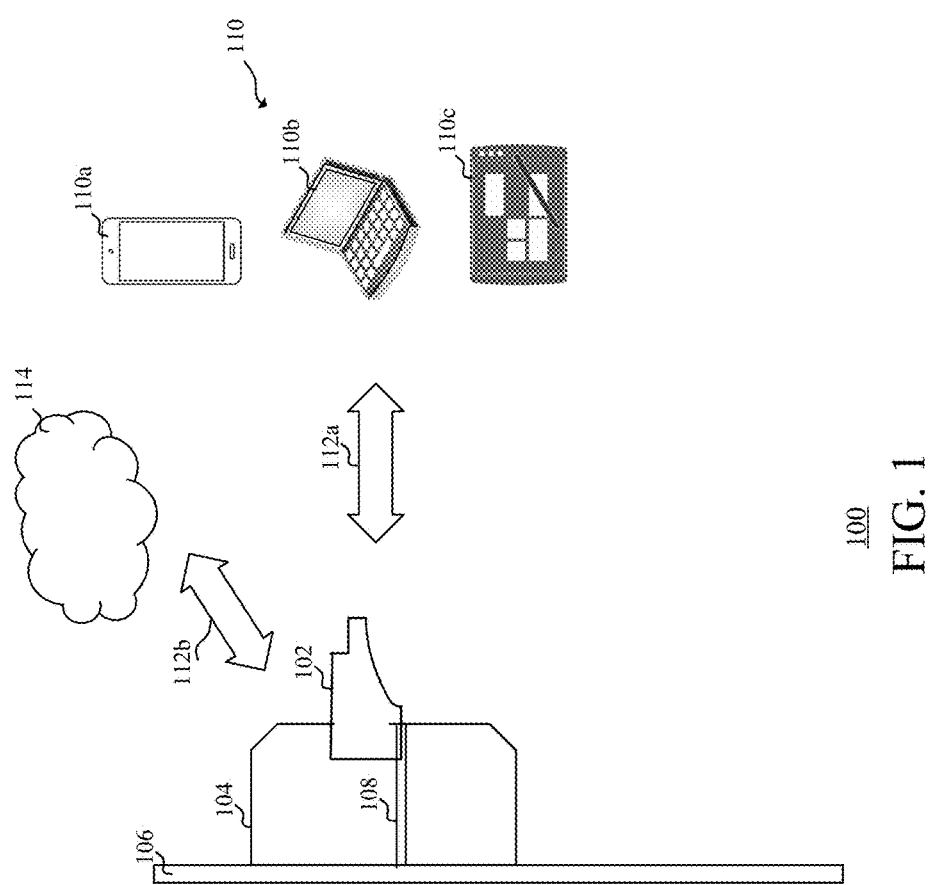
FIG. 1 shows an example antenna alignment environment based on the principles disclosed herein.

FIG. 1 shows an example antenna alignment (also referred to as antenna tuning) environment 100, based on the principles disclosed herein. The example environment 100 includes an antenna 104, which may be disposed on a pole 106. The pole 106 is just an example, and the antenna 104 may be located on any type of structure such as an antenna tower, rooftop, treetop, building wall, vehicle top, satellite, and/or any other type of structure. Furthermore, the antenna 104 can be any type of antenna, including a dome antenna, loop antenna, Yagi-type antenna, and or any type of antenna that may have to be aligned for optimal performance. Although the antenna 104 is described herein as a singular antenna, a combination of antennas (including active antenna arrays) that may have to be aligned should also be considered within the scope of this disclosure. The antenna 104 may use any kind of transmit/receive frequency, e.g., the antenna 104 may be a microwave antenna used in a cellular communications tower.

An antenna alignment device 102 may be attached to the antenna 104 using a coupler 108. The antenna alignment device 102 may include any type of cameras, sensors, displays, voltmeters, and or other components configured to align (or tune) the antenna 104. When coupled to the antenna 104, the orientation of the antenna alignment device 102 may correspond to the orientation of the antenna 104. The alignment may include parameters such as roll, pitch (also referred to as tilt), and or azimuth; as understood in the art.

The antenna alignment environment 100 may be a network environment. For example, the antenna alignment device 102 may communicate with one or more local external devices such as e.g., a smartphone 110a, a laptop computer 110b, a tablet computer 110c (collectively, devices 110), through a local communication link 112a. The local communication link may include communication protocols such as Bluetooth, Bluetooth Low Energy, WiFi, Zigbee, and or any other type of local communication protocols. The antenna alignment device 102 may also communicate with a remote cloud 114 (and or any other types of computing systems) through a remote link 112b. The remote link 112b may include, for example, an Internet link. It should, however, be understood that the specific configuration of the local link 112a and the remote link 112b is merely intended as an example and should not be considered limiting. Any type of interconnection between the antenna alignment device 102 and other remote devices and or systems should be considered within the scope of this disclosure.

Figure 2:
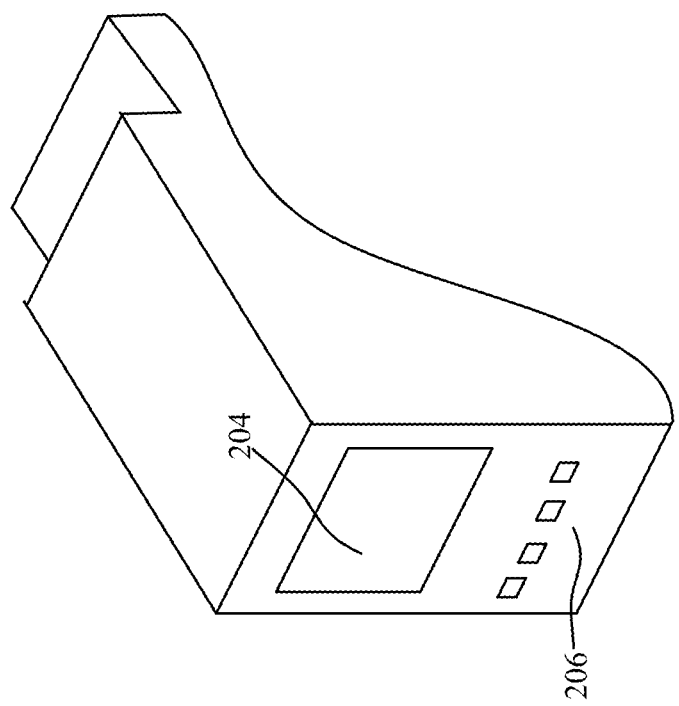
FIG. 2 shows perspective views of an example antenna alignment device based on the principles disclosed herein.
Figure 2:
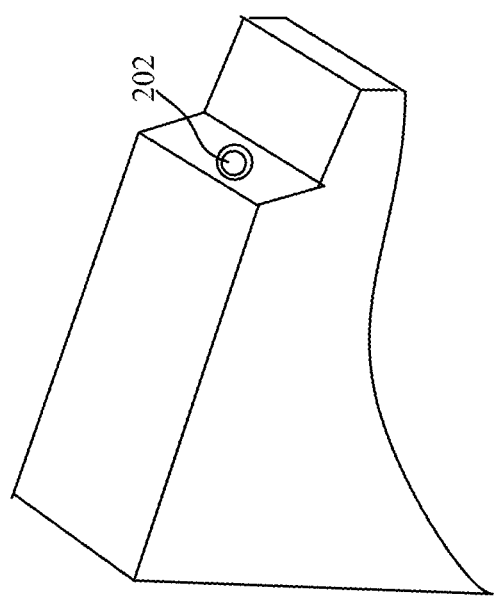

In operation, a camera of the antenna alignment device 102 may take a line-of-sight image of the surrounding environment (see FIGS. 2-3). As the antenna alignment device 102 is directed to the boresight of the antenna 104, the line-of-sight image may represent the view from the antenna to the surrounding environment. The line-of-sight image may be viewed on the antenna alignment device 102, on local devices 110, and or from the remote cloud 114. In one or more embodiments, if the line-of-sight image is displayed, an antenna radiation pattern corresponding to the antenna 104 may be overlayed on the line-of-sight image. This overlaying may allow a technician or other users to observe the antenna radiation pattern vis-à-vis the surrounding environment. The overlaying therefore may be used to determine whether the corresponding radio frequency design was effective and also to assess the coverage quality of the antenna 104. It should be appreciated that the radiation pattern can be displayed even if the line-of-sight image is not being displayed.

FIG. 2 shows perspective views of an example antenna alignment device 102, based on the principles disclosed herein. More particularly, FIG. 2 shows perspective views of an external form factor of the antenna alignment device 102. The external form factor generally shows optical components for the antenna alignment device 102. It should however be understood that other sensors (e.g., magnetic field sensors) may be disposed in the external form factor of the antenna alignment device 102. As shown, the optical components may include, for example, a camera 202, a display 204, and a control panel 206.

The camera 202 may be any kind of camera, including but not limited to an optical camera, infrared camera, and/or any other type of image sensor that may capture any type of electromagnetic waves to generate an image of objects in the line-of-sight of the camera 202 (i.e., image of objects within the surrounding environment of the antenna alignment device 102). As the antenna alignment device 102 is directed towards the boresight of the antenna 104, the line-of-sight of the camera may be the view from the antenna to the surrounding environment. As discussed above, the line-of-sight images may be displayed on the display 204 and sent to other external devices if desired.

The display 204 may display the line-of-sight of the camera 202. The display 204 may include any kind of display such as liquid crystal display (LCD), light emitting diode (LED) display, plasma display, and or any other type of display known in the art. The display 204 may be used to capture the line-of-sight image from the camera 202 (e.g., using a save image functionality and or capturing a screenshot).

The control panel 206 may allow configuration of the antenna alignment device 102. For instance, the control panel 206 may include buttons that may allow a user to configure various settings, e.g., indicate a desired alignment for the antenna 104, control a zoom level of the display 204, control the communications between the antenna alignment device 102 with other external devices, and or other settings.

Figure 3A:
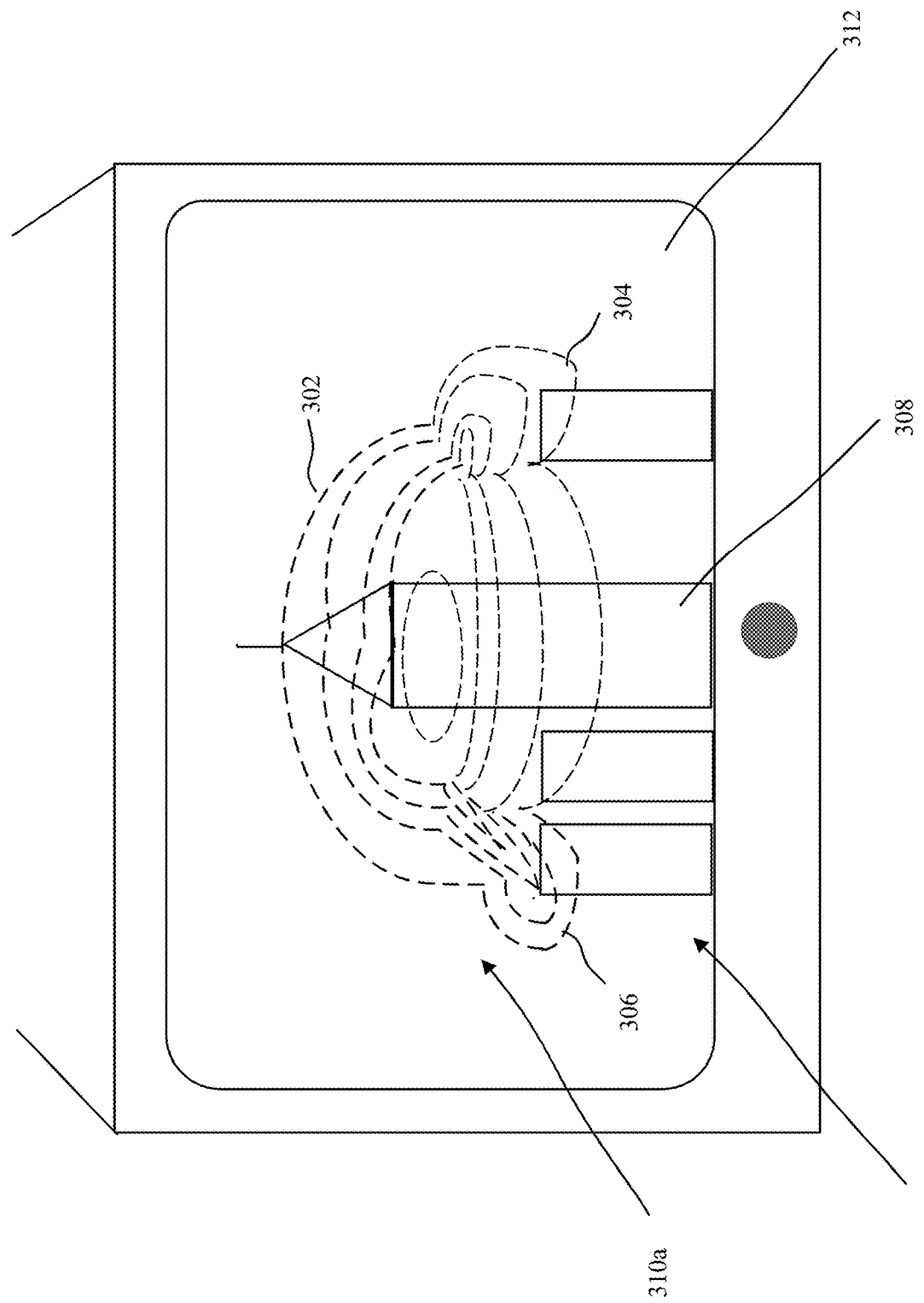
FIGS. 3A-3B show displays showing a line-of-sight image with an antenna radiation pattern overlaid thereon, based on the principles disclosed herein.

FIG. 3A shows an example display 300a showing a line-of-sight image 312 with an antenna radiation pattern 310a overlaid thereon, based on the principles disclosed herein. The display 300a may be a part of any device, including but not limited to an antenna alignment device (e.g., antenna alignment device 102), a local device (e.g., local devices 110), and or a cloud device (e.g., associated with the remote cloud 114). It should also be understood that the specific radiation pattern within the display 300a is just an example and other radiation patterns should also be considered within the scope of this disclosure.

As shown, the line-of-sight image 312 may comprise structures 314 such as a building 308. There may other structures such as trees, bridges, towers, and or any other type of structure. When the line-of-sight image 312 is obtained, an antenna radiation pattern 310a may be overlaid on the line-of-sight image. As shown, the antenna radiation pattern 310a may comprise a main lobe 302 and side lobes 304, 306. The overlaying of the antenna radiation pattern on the line-of-sight image may therefore allow a technician and or any other type of user to determine the effect of surrounding environment in the radiation pattern. For example, as shown the building 308 may obstruct signal in the main lobe, and the smaller buildings on the side of the building 308 may obstruct the signals from the side lobes 304, 306.

Figure 3B:
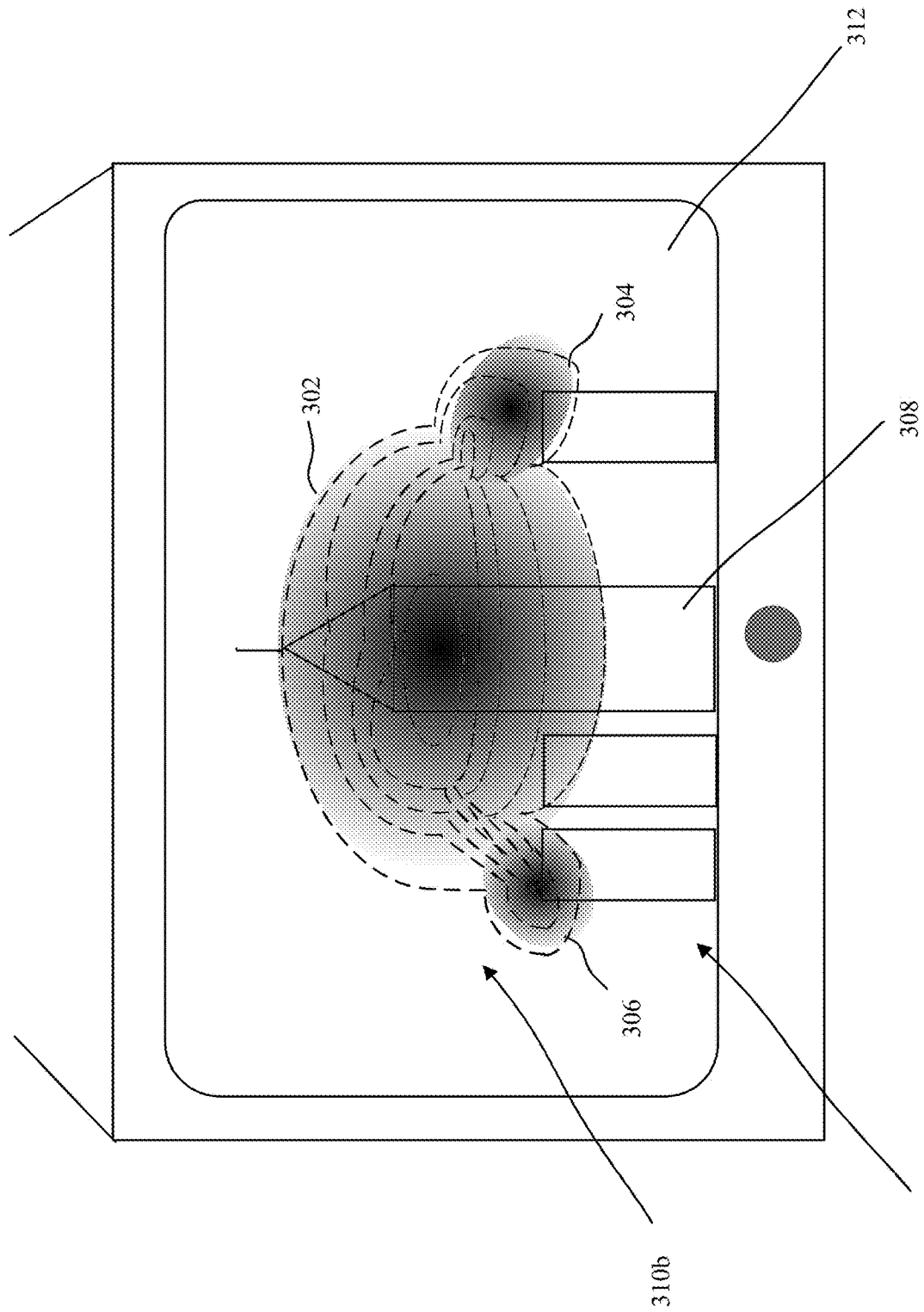

FIG. 3B shows another example display 300b showing a line-of-sight image 312 with an antenna radiation pattern 310b overlaid thereon, based on the principles disclosed herein. The antenna radiation pattern 310b on the display 300b may be the same as the antenna radiation pattern 310a on the display 300a, except that antenna radiation pattern 310a may also show a relative signal strength of the antenna. Particularly, the darker shaded portions toward the center of each of the center lobe 302 and the side lobes 304, 306 may indicate a stronger signal compared to the lighter shaded portions toward the periphery of each of the center lobe 302 and the side lobes 304, 306.

It should, however, be understood that the shading shown in the example display 300b is just but an example and any kind of display showing relative signal strength within a radiation pattern should be considered within the scope of this disclosure. For example, for active, array-based antennas, the shading on the pattern may show a beam-steering "reach" of active antennas—both horizontal and vertical—around the boresight.

Furthermore, the image 312 may be zoomed and scaled appropriately along with the radiation patterns 310a, 310b. That is, the image 312 may be zoomed and scaled to match the field of view and zoom level of the camera; such that there is a correspondence between the radiation patterns 310a, 310b and the image.

Figure 4:
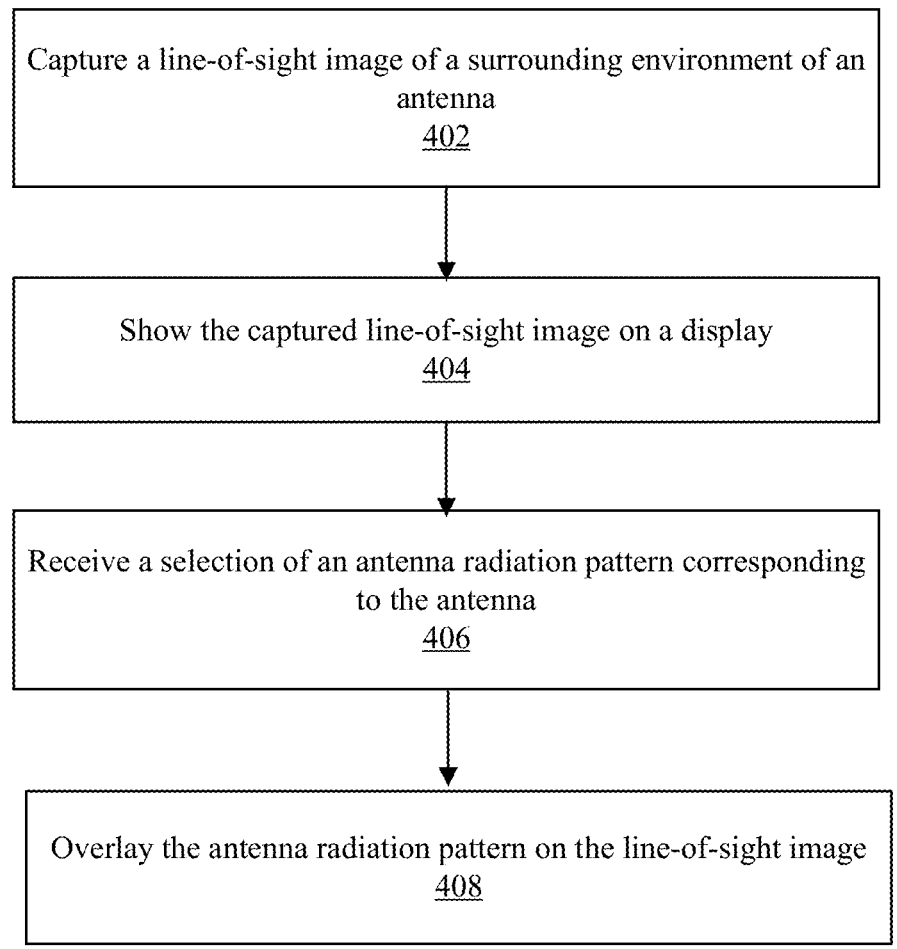
FIG. 4 shows a flow diagram of an example antenna alignment method, based on the principles disclosed herein.

FIG. 4 shows a flow diagram of an example antenna alignment method 400, based on the principles disclosed herein. The method 400 may be performed by one or more components in the antenna alignment environment 100. The steps of the method 400 are merely examples and therefore should not be considered limiting. Other methods with additional, alternative, or fewer number of steps should also be considered within the scope of this disclosure.

The method 400 may begin at step 402 where a line-of-sight image of a surrounding environment of an antenna alignment device may be captured. The line-of-sight image may be captured by a camera in the antenna alignment device. In some embodiments, the line-of-sight image may be captured when the antenna has been aligned according to the radio frequency design alignment parameters. In other words, an alignment may be performed to conform to alignment parameters calculated using an ideal model of antenna site. The ideal model is typically blind to the surrounding environment and does not consider different objects that violate the assumptions associated with the ideal model. The line-of-sight image, however, rectifies this deficiency by providing a "view" from the antenna to the surrounding environment.

At step 404, the captured line-of-sight image may be shown on a display. In some embodiments, the display may be on the antenna alignment device itself. In other embodiments, the display may be on one or more local external devices wirelessly connected to the antenna alignment device through a local connection. The local external devices may include mobile phones, mobile laptops, and or tablets carried by the technician aligning the antenna. In some other embodiments, the display may be on one or more remote external devices connected to the antenna alignment device through a remote connection.

At step 406, a selection of an antenna radiation pattern corresponding to the antenna may be received on a selection user interface. The selection user interface may be associated with the displays described above. For example, the selection user interface may be within the antenna alignment device displaying the captured line-of-sight image. The selection user interface may be provided as a selectable option or application on the display. Once the option is selected, the technician may be able to toggle through the various antenna types until the type of antenna being aligned is shown. The technician may then make the selection.

In other embodiments, the selection user interface may be on a local external device (e.g., a mobile phone carried by the technician). The local external device may display the captured line-of-sight image. Within the display, the local external device may provide GUI objects that that the technician may select to access the list of various antenna types. The technician may then select the desired antenna type (i.e., the antenna being aligned) from the list.

In some other embodiments, the selection interface may be on a remote external device such as a device connected to the antenna alignment device through a remote network such as the Internet. The remote external device may also receive and display the line-of-sight image. The remote external device may also provide a command line interface-based and or GUI-based selection of the desired antenna type.

At step 408, the selected antenna radiation pattern (e.g., through the selection of the desired antenna type) may be overlaid on the line-of-sight image. Depending upon where the line-of-sight image was shown in the above steps, the overlay may be presented on the antenna alignment device, a local external device, and or a remote external device. The overlay may enable of the visualization of the antenna radiation pattern within the surrounding environment of the antenna. For example, the overlay may enable the technician and or other users to visualize how objects within the surrounding environment may adversely affect the antenna radiation pattern.

The overlay may help assess during an initial alignment whether the original radio frequency design parameters are acceptable or whether changes need to be made based on the real-world surrounding environment. Therefore, there may be no wait time to see if the key performance indicators are met. These indicators may be measured during the initial alignment, thereby avoiding costly trips back to the antenna site. Furthermore, troubleshooting (e.g., time to repair) may also be minimized as line-of-sight images and the overlays may be analyzed prior to team deployment on the site. Based on the overlays, clear and specific alignment instructions may be provided to the site crew prior to the climb. These are just but a few benefits of the embodiments disclosed herein.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. An antenna alignment system comprising:
a camera configured to capture a line-of-sight image of a surrounding environment of an antenna;
a display configured to show the captured line-of-sight image; and
a selection user interface configured to allow a user to select an antenna radiation pattern corresponding to a type of the antenna,
wherein the display is further configured to overlay the antenna radiation pattern on the line-of-sight image enabling a visualization of the antenna radiation pattern within the surrounding environment.

2. The antenna alignment system of claim 1, wherein the camera is on an antenna alignment device and the display is on an external device.

3. The antenna alignment system of claim 2, wherein the external device comprises a local device wirelessly connected to the antenna alignment device through a local communication link.

4. The antenna alignment system of claim 2, wherein the external device comprises a remote device wirelessly connected to the antenna alignment device through a remote communication link.

5. The antenna alignment system of claim 1, wherein each of the camera and the display is on an antenna alignment device.

6. The antenna alignment system of claim 1, wherein the visualization of the antenna radiation pattern within the surrounding environment comprises a visualization of potential obstructions to the antenna radiation pattern by one or more objects within the surrounding environment.

7. The antenna alignment system of claim 1, wherein the line-of-sight image is captured when the antenna is aligned according to alignment parameters of a radio frequency design.

8. The antenna alignment system of claim 7, wherein the alignment parameters comprise at least one of a roll, tilt, or azimuth.

9. An antenna alignment apparatus comprising:
a camera configured to capture a line-of-sight image of a surrounding environment of an antenna;
a display configured to show the captured line-of-sight image; and
a selection user interface configured to allow a user to select an antenna radiation pattern corresponding to a type of the antenna,
wherein the display is further configured to overlay the antenna radiation pattern on the line-of-sight image enabling a visualization of the antenna radiation pattern within the surrounding environment.

10. The antenna alignment apparatus of claim 9, wherein the visualization of the antenna radiation pattern within the surrounding environment comprises a visualization of potential obstructions to the antenna radiation pattern by one or more objects within the surrounding environment.

11. The antenna alignment apparatus of claim 9, configured to capture the line-of-sight image when the antenna is aligned according to alignment parameters of a radio frequency design.

12. The antenna alignment apparatus of claim 11, wherein the alignment parameters comprise at least one of a roll, tilt, or azimuth.

13. The antenna alignment apparatus of claim 11, configured to transmit the line-of-sight image to an external device.

14. The antenna alignment apparatus of claim 13, wherein the external device comprises a local device wirelessly connected to the antenna alignment apparatus through a local communication link.

15. The antenna alignment apparatus of claim 13, wherein the external device comprises a remote device wirelessly connected to the antenna alignment apparatus through a remote communication link.

16. An antenna alignment method comprising:
capturing, using a camera, a line-of-sight image of a surrounding environment of an antenna;
showing, on a display, the captured line-of-sight image;
receiving, on a user interface, a selection of an antenna radiation pattern corresponding to the antenna; and
overlaying, on the display, the antenna radiation pattern on the line-of-sight image to enable a visualization of the antenna radiation pattern within the surrounding environment.

17. The antenna alignment method of claim 16, wherein the visualization of the antenna radiation pattern within the surrounding environment comprises a visualization of potential obstructions to the antenna radiation pattern by one or more objects within the surrounding environment.

18. The antenna alignment method of claim 16, wherein capturing the line-of-sight image comprises capturing the line-of-sight image when the antenna is aligned according to alignment parameters of a radio frequency design, and wherein the alignment parameters comprise at least one of a roll, tilt, or azimuth.

19. The antenna alignment method of claim 16, further comprising:
transmitting, using a local communication link, the line-of-sight image to a local external device.

20. The antenna alignment method of claim 16, further comprising:
transmitting, using a remote communication link, the line-of-sight image to a remote external device wirelessly.

* * * * *